United States Patent
Onodera et al.

(10) Patent No.: US 8,181,449 B2
(45) Date of Patent: May 22, 2012

(54) CONTROL METHOD OF EXHAUST GAS PURIFICATION SYSTEM AND EXHAUST GAS PURIFICATION SYSTEM

(75) Inventors: Takao Onodera, Fujisawa (JP); Naofumi Ochi, Fujisawa (JP); Wei Wu, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 865 days.

(21) Appl. No.: 11/922,846

(22) PCT Filed: Jun. 20, 2006

(86) PCT No.: PCT/JP2006/312348
§ 371 (c)(1),
(2), (4) Date: Dec. 26, 2007

(87) PCT Pub. No.: WO2007/010700
PCT Pub. Date: Jan. 25, 2007

(65) Prior Publication Data
US 2009/0082938 A1    Mar. 26, 2009

(30) Foreign Application Priority Data
Jul. 15, 2005    (JP) ................... 2005-206375

(51) Int. Cl.
*F01N 3/00*    (2006.01)
(52) U.S. Cl. ............... 60/295; 60/274; 60/286; 60/297; 60/303
(58) Field of Classification Search ............ 60/274, 60/285, 286, 295, 297, 303, 311
See application file for complete search history.

(56) References Cited

U.S. PATENT DOCUMENTS

| | | | |
|---|---|---|---|
| 6,931,842 B2 * | 8/2005 | Ohtake et al. | 60/295 |
| 7,013,638 B2 * | 3/2006 | Hiranuma et al. | 60/286 |
| 7,169,364 B2 * | 1/2007 | Ohtake et al. | 422/168 |
| 7,343,735 B2 * | 3/2008 | Wang et al. | 60/286 |
| 7,584,606 B2 * | 9/2009 | Colignon | 60/295 |
| 2004/0133335 A1 | 7/2004 | Nakano et al. | |
| 2010/0011748 A1 * | 1/2010 | Yokota | 60/286 |
| 2010/0236222 A1 * | 9/2010 | Gomez, III | 60/277 |

FOREIGN PATENT DOCUMENTS

JP     10-288031     10/1998
(Continued)

OTHER PUBLICATIONS

International Search Report (PCT/ISA/210) mailed Jul. 25, 2006 in connection with the International Application PCT/JP2006/312348.
Patent Abstracts of Japan, Publication No. 10-288031, Published Oct. 27, 1998.
(Continued)

*Primary Examiner* — Binh Q Tran
(74) *Attorney, Agent, or Firm* — Staas & Halsey LLP (57) ABSTRACT

An exhaust gas purification system has an exhaust gas purification device for purifying components in exhaust gas from an internal combustion engine. In order to recover a purification ability of the device, and in order to prevent oil dilution occurring when post injection is conducted during control that raises the temperature of exhaust gas, the system performs the following, during control; injection quantities of post injections are calculated based on previously set map data, accumulated to calculate a post injection accumulated injection amount, and, when the accumulated injection amount exceeds a predetermined value, the post injection is stopped to cease the regenerative control.

6 Claims, 7 Drawing Sheets

FOREIGN PATENT DOCUMENTS

| | | |
|---|---|---|
| JP | 10-288067 | 10/1998 |
| JP | 3358552 | 10/2002 |
| JP | 2003-269230 | 9/2003 |
| JP | 2003-322049 | 11/2003 |
| JP | 2004-197697 | 7/2004 |
| JP | 2005-155441 | 6/2005 |
| JP | 2005-155574 | 6/2005 |
| WO | WO 2005049994 A1 * | 6/2005 |

OTHER PUBLICATIONS

Patent Abstracts of Japan, Publication No. 10-288067, Published Oct. 27, 1998.
Patent Abstracts of Japan, Publication No. 2000-045828, Published Feb. 15, 2000 (Correspond to 3358552, Reference: AC).
Patent Abstracts of Japan, Publication No. 2003-269230, Published Sep. 25, 2003.

* cited by examiner

| Primary fuel injection quantity Qmi \ Engine speed Nej | Ne1 | · | Nej | · | · | Nen |
|---|---|---|---|---|---|---|
| Qm1 | Qps11 | · | Qps1j | · | · | Qps1n |
| · | · | · | · | · | · | · |
| · | · | · | · | · | · | · |
| · | · | · | · | · | · | · |
| Qmi | Qpsi1 | · | Qpsij | · | · | Qpsin |
| · | · | · | · | · | · | · |
| · | · | · | · | · | · | · |
| · | · | · | · | · | · | · |
| · | · | · | · | · | · | · |
| · | · | · | · | · | · | · |
| Qmm | Qpsm1 | · | Qpsmj | · | · | Qpsmn |

Reference injection quantity Qpsij

CONTROL METHOD OF EXHAUST GAS PURIFICATION SYSTEM AND EXHAUST GAS PURIFICATION SYSTEM

This application claims the benefit under 35 U.S.C. Section 371, of PCT International Application Number PCT/JP2006/312348, filed Jun. 20, 2006 and Japanese Application No. 2005-206375filed Jul. 15, 2005 in Japan, the contents of which are incorporated herein by reference.

FIELD OF THE INVENTION

The present invention relates to a control method of an exhaust gas purification system and an exhaust gas purification system provided with: an exhaust gas purification device for purifying components in the exhaust gas of an internal combustion engine such as a diesel engine; and regenerative control means for recovering the purification ability of the exhaust gas purification device, the means conducting a regenerative control that includes post injection as part of an in-cylinder fuel injection control, and an exhaust gas temperature raising control that raises the temperature of the exhaust gas.

DESCRIPTION OF THE RELATED ART

Regulations regarding the exhaust quantities of particulate matter (hereinafter, PM) exhausted from diesel internal combustion engines are, along with NOx, CO, and HC, etc., becoming stricter year by year. Technology has been developed wherein this PM is collected at a filter referred to as a diesel particulate filter (hereinafter, DPF), thereby reducing the quantity of PM exhausted to the exterior. Among them, there are DPF devices as well as continuous regeneration type DPF devices carrying a catalyst.

Nevertheless, in these continuous regeneration type DPF devices, when the exhaust gas temperature is at or above approximately 350° C., the PM collected in this DPF is continuously combusted and purified, and the DPF self-regenerates. However, in the case of low exhaust temperature (for example, in cases of an ongoing low exhaust temperature state, such as when the internal combustion engine is operating at idling or driving at low load/low speed), the exhaust gas temperature is low, the catalyst temperature decreases, and the catalyst is not activated. For this reason, oxidation reactions are not promoted, and it becomes difficult to regenerate the filter by oxidizing PM. Consequently, PM accumulation to the filter continues, and since filter clogging progresses, there arises the problem of exhaust pressure increase due to the clogging of this filter.

As one technique to solve such problems, when this filter clogging exceeds a predetermined quantity, a regenerative control is conducted wherein the exhaust temperature is forcibly raised, and collected PM is forcibly removed by combustion. Among the detection methods of this filter clogging, there is a method wherein differential pressure between before and after a filter is detected, and a method wherein the trapped PM quantity from engine operating conditions is calculated from previously set map data and the like to solve for and detect the PM accumulation amount.

Also, in this regenerative control, an exhaust gas temperature raising control is conducted. In this regenerative control, in the case where the exhaust temperature is lower than the activation temperature of an oxidation catalyst disposed upstream of the filter, or alternatively, an oxidation catalyst supported on the filter, an exhaust gas temperature raising control including multi-injection or exhaust throttling, etc., is conducted, thereby raising the temperature of the exhaust gas above the temperature at which PM trapped at the filter combusts. As a result, PM is removed by combustion and the filter is regenerated.

As methods for this exhaust gas temperature raising, there are methods that conduct multi-injection (multi-step delay injection) or post injection in an in-cylinder fuel injection control. In this multi-injection or post injection, for the in-cylinder injection, an auxiliary injection is conducted after the primary injection with the timing slower than ordinary combustion, in other words, with a delayed timing such that combustion continues.

However, when this post injection is conducted, a portion of fuel injected in-cylinder flows to the oil pan along the cylinder walls, and mixes with the lubricating oil. For this reason, oil dilution due to fuel occurs.

Accordingly, it has been thought to conduct a control wherein the time spent conducting post injection is accumulated, and when this accumulated value exceeds a predetermined determination value, the execution of the post injection is prohibited. However, the post injection execution time and the fuel injection quantity diluting the lubricating oil are not necessarily proportional, and this fuel injection quantity changes according to factors such as changes in injection pressure. For this reason, if a control is conducted based on injection time, the fuel injection quantity becomes too large, and the quantity of oil dilution increases.

As one example of an anti-oil dilution measure, internal combustion engine exhaust purification devices have been proposed like those described in Japanese Patent Application Kokai Publication No. H10-288031 and Japanese Patent Application Kokai Publication No. H10-288067. These devices are exhaust gas purification devices that steadily provide fuel (hydrocarbons) to the exhaust gas, thereby purifying by reducing NOx at the NOx catalyst. In these devices, post injection is not used to raise the temperature of the exhaust gas, but to provide fuel (reducing agent). Also, in order to solve the problem of oil dilution due to the addition of uncombusted fuel to the exhaust gas during post injection, the post injection quantity in each cylinder is limited within a range given by a lower bound set value and an upper bound set value.

In these exhaust gas purification devices, the post injection quantity and post injection period are configured based on operating conditions and catalyst activation conditions. In addition, the lower bound set value and the upper bound set value are configured based on the estimated internal conditions of each cylinder, and corrected for in-cylinder pressure and in-cylinder temperature.

However, in this type of control, since a very fine control is conducted for each cylinder, it takes time to calculate the configured values. For this reason, although control is possible in an exhaust purification device always conducting post injections and the like, there is a problem in that control over brief intervals in a regenerative control is not practical. In addition, there is also a problem in that the program for conducting this kind of control is complicated, and the creation thereof requires a great deal of time and effort.

In addition, an internal combustion engine fuel injection control device like that described in Japanese Patent No. 3358552,for example, has been proposed. In this device, in order to conduct post injection when the in-cylinder temperature has reached a target temperature, the post injection period is configured according to the combustion quantity of fuel, crank angle, and coolant water loss. As a result, post injections are conducted wherein in-cylinder temperature is adjusted, and undesirable reforming of HC components and losing fuel by combustion are avoided. This post injection quantity is calculated from post injection quantity map based on the catalyst temperature as well as the intake air quantity.

Furthermore, for example as described in Japanese Patent Application Kokai Publication No. 2003-269230, an internal combustion engine has also been proposed wherein a swirl is generated within the combustion chamber in order to avoid the occurrence of oil dilution.

Patent Literature No. 1: Japanese Patent Application Kokai Publication No. H10-288031
Patent Literature No. 2: Japanese Patent Application Kokai Publication No. H10-288067
Patent Literature No. 3: Japanese Patent No. 3358552
Patent Literature No. 4: Japanese Patent Application Kokai Publication No. 2003-269230

SUMMARY OF THE INVENTION

The object of the present invention is to provide a control method of an exhaust gas purification system as well as an exhaust gas purification system provided with an exhaust gas purification device for purifying components in the exhaust gas of an internal combustion engine such as a diesel engine, wherein the oil dilution that occurs during an exhaust gas temperature raising control is prevented before it occurs, this control being conducted in order to recover the purification ability of the exhaust gas purification device and wherein the exhaust gas temperature is raised by conducting post injection in an in-cylinder fuel injection control.

In order to achieve the above-described object, a control method of the exhaust gas purification system of the present invention performs the following. In the exhaust gas passage of an internal combustion engine, the exhaust gas purification system is provided with an exhaust gas purification device for purifying components in exhaust gas, and regenerative control means that conducts a regenerative control for recovering purification ability of the exhaust gas purification device, and which includes post injection as part of an in-cylinder fuel injection control. During the regenerative control, injection quantities of post injections are calculated based on previously set map data. These calculated injection quantities are accumulated to calculate an accumulated injection amount of post injections, and when the accumulated injection amount has exceeded a predetermined determination value, the post injection is stopped to cease the regenerative control.

In other words, in the case where the time conducting post injections is accumulated, and where a control is conducted to stop the execution of post injections when this accumulated value has exceeded the predetermined determination value, the post injection execution time and the fuel injection quantity diluting the lubrication oil are not necessarily proportional. Since this fuel injection quantity changes according to factors like the injection pressure, conducting a control based on injection times causes the fuel injection quantity to become too large, and thereby the oil dilution quantity increases.

However, in the present invention, the injection quantities of the post injections themselves, and not the injection times, are calculated and accumulated. At the point when this accumulated injection amount becomes larger than the predetermined determination value, a control is conducted to stop the post injection. For this reason, it becomes possible to conduct control with higher precision, and excessive injection of fuel due to post injection is prevented. As a result, the occurrence of oil dilution due to fuel is avoided.

In the above-described control method of the exhaust gas purification system, the injection quantities of the post injections are calculated based on map data having the engine speed and the primary fuel injection quantity as parameters, the value of which is then corrected according to the atmospheric pressure. Thus, injection quantities of post injections are more accurately calculated with a simple algorithm, and it becomes possible to conduct control with higher precision.

In the above-described control method of the exhaust gas purification system, in the case where the exhaust gas purification device is a continuous regeneration type diesel particulate filter (continuous regeneration type DPF device), the exhaust gas temperature is raised by an exhaust gas temperature raising control including post injection, PM (particulate matter) trapped by the filter is heated to the combustion temperature, and the PM is removed by combustion. Thus, the purification ability of the exhaust gas purification device, i.e., the ability to trap PM, is recovered.

In addition, in order to achieve the above-described object, an exhaust gas purification system of the present invention is configured like the following. In the exhaust gas passage of an internal combustion engine, an exhaust gas purification system is provided with an exhaust gas purification device for purifying components in exhaust gas, and regenerative control means that conducts a regenerative control for recovering the purification ability of the exhaust gas purification device, and which includes post injection as part of an in-cylinder fuel injection control. During the regenerative control, the regenerative control means calculates injection quantities of post injections based on previously set map data. These calculated injection quantities are accumulated to calculate an accumulated injection amount of post injections, and when the accumulated injection amount has exceeded a predetermined determination value, the post injection is stopped to cease the regenerative control.

As a result of this configuration, the injection quantities of the post injections themselves, and not the injection times, are calculated and accumulated. At the point when this accumulated injection amount becomes larger than the predetermined determination value, a control is conducted to stop the post injection. For this reason, it becomes possible to conduct control with higher precision, and excessive injection of fuel due to post injection is prevented. As a result, the occurrence of oil dilution due to fuel is avoided.

In addition, in the above-described exhaust gas purification system, the regenerative control means is configured to calculate the injection quantities of the post injections by calculating a value based on map data having the engine speed and the primary fuel injection quantity as parameters, and then correcting this value according to the atmospheric pressure. As a result of this configuration, injection quantities of post injections are more accurately calculated with a simple algorithm, and it becomes possible to conduct control with higher precision.

In addition, in the above-described exhaust gas purification system, any one of the following, or a combination thereof, may be adopted as the continuous regeneration type diesel particulate filter device: a continuous regeneration type diesel particulate filter device with a filter carrying oxidation catalyst; a continuous regeneration type diesel particulate filter device with filter and an oxidation catalyst disposed upstream of the filter; or a continuous regeneration type diesel particulate filter device with the filer carrying oxidation catalyst and an oxidation catalyst disposed upstream of the filter.

With these configurations, an exhaust gas purification system can be provided that implements the above-described control method of the exhaust gas purification system and wherein the same actions and effects are realized.

According to the control method of the exhaust gas purification system and the exhaust gas purification system of the present invention, an exhaust gas purification device is provided for purifying components in the exhaust gas of an internal combustion engine such as a diesel engine. When conducting a regenerative control for recovering purification ability of this exhaust gas purification device, the regenerative control including post injections as part of an in-cylinder fuel injection control, the post injection quantities themselves, and not post injection times, are accumulated. For this reason, a more precise control can be executed, and oil dilution can be avoided before it occurs.

DESCRIPTION OF THE EMBODIMENTS

Hereinafter, an embodiment of the control method of the exhaust gas purification system and the exhaust gas purification system in accordance with the present invention will be described by taking as an example an exhaust gas purification system provided with a continuous regeneration type DPF device configured with a combination of an oxidation catalyst and a catalytic filter (a filter carrying catalyst), and with reference to accompanying drawings.

Figure 1:
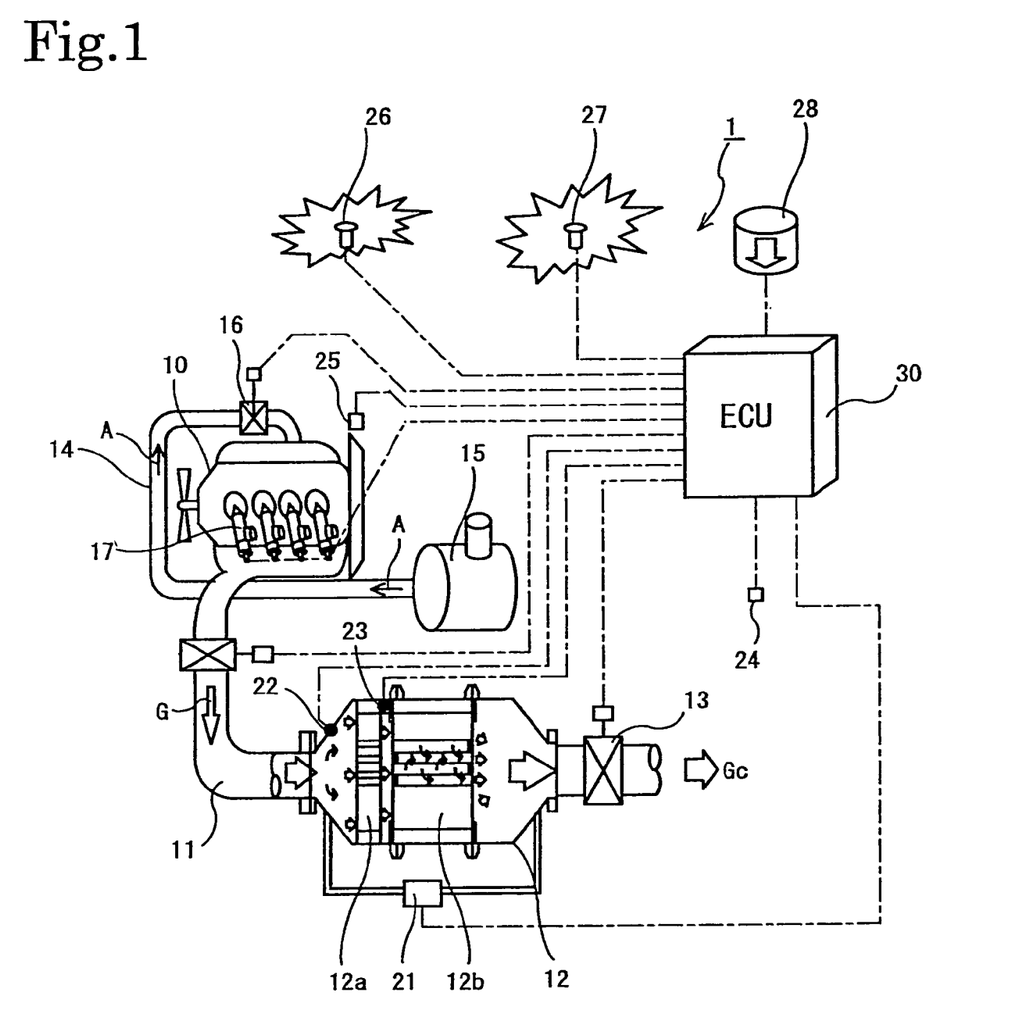
FIG. 1 is a diagram of the configuration of an exhaust gas purification system in accordance with an embodiment of the present invention.

FIG. 1 shows the configuration of an exhaust gas purification system 1 of the present embodiment. This exhaust gas purification system 1 is configured having a continuous regeneration type DPF device 12 in an exhaust passage 11 of a diesel engine (internal combustion engine) 10. This continuous regeneration type DPF device 12 is configured having an upstream oxidation catalyst 12a, and a downstream catalytic filter 12b. In addition, an exhaust throttle valve (exhaust throttle) 13 is provided downstream of the continuous regeneration type DPF device 12.

The oxidation catalyst 12a includes an oxidation catalyst such as platinum (Pt) carried on a carrier of porous ceramic honeycomb or other structure. The catalytic filter 12b includes a monolith honeycomb wall flow type filter wherein the inlets and outlets of the porous ceramic honeycomb channels are plugged in alternation, or a felt-like filter wherein inorganic fibers of alumina or other materials are randomly layered. Upon this filter portion, a catalyst of platinum, cerium oxide, or similar substance is carried.

In the catalytic filter 12b, in the case where a monolith honeycomb wall flow type filter is adopted, PM (particulate matter) in an exhaust gas G is trapped at the porous ceramic walls. In the case where a fiber type filter is adopted, the PM is trapped by the inorganic fibers of the filter.

In addition, in order to estimate an accumulated amount of PM at the catalytic filter 12b, a differential pressure sensor 21 is provided in the conduit connected to the front and back of the continuous regeneration type DPF device 12. In addition, for use in the regenerative control of the catalytic filter 12b, an oxidation catalyst inlet exhaust temperature sensor 22 is provided upstream of the oxidation catalyst 12a, and a filter inlet exhaust temperature sensor 23 is provided between the oxidation catalyst 12a and the catalytic filter 12b.

The output values of these sensors are input into a control device (ECU: Engine Control Unit) 30 that conducts both general control of the operation of the engine 10 and also conducts the regenerative control of the continuous regeneration type DPF device 12. According to the control signal output from this control device 30, apparatus such as an air-intake throttle valve 16, a fuel injection apparatus (injection nozzle) 17 of the engine 10, and an EGR valve (not shown in the drawings) are controlled. The air-intake throttle valve 16, being provided in an air-intake passage 14, regulates a quantity of air-intake A that passes through an air cleaner 15 and enters an air-intake manifold. The fuel injection apparatus 17 is connected to a common rail injection system (not shown in the drawings) that temporarily stores fuel, the pressure thereof increased with a fuel pump (not shown in the drawings). The EGR valve is provided along with an EGR cooler (not shown in the drawings) in an EGR passage (not shown in the drawings) and regulates EGR quantities.

For operating the engine, information is input into the control device 30, including: information about accelerator opening from an accelerator position sensor (APS) 24 and the engine speed, etc., from a revolution sensor 25, as well as information about vehicle speed, coolant water temperature, etc. Also, a power application time signal is output from the control device 30 such that a predetermined quantity of fuel is injected from the fuel injection device 17.

In addition, the regenerative control of this continuous regeneration type DPF device 12 is configured to be able to forcibly conduct regeneration automatically while the vehicle is moving. Not only that, it is configured to be able to alert the driver when the trapped quantity of PM at the catalytic filter 12b exceeds a fixed value and the catalytic filter 12b has become clogged. When the driver voluntarily stops the vehicle, regeneration is forcibly conducted. For this reason, a blinking indicator (DPF lamp) 26 for alerting the driver, a warning indicator (warning lamp) 27, and a regeneration button (manual regeneration switch) 28 are provided.

Figure 2:
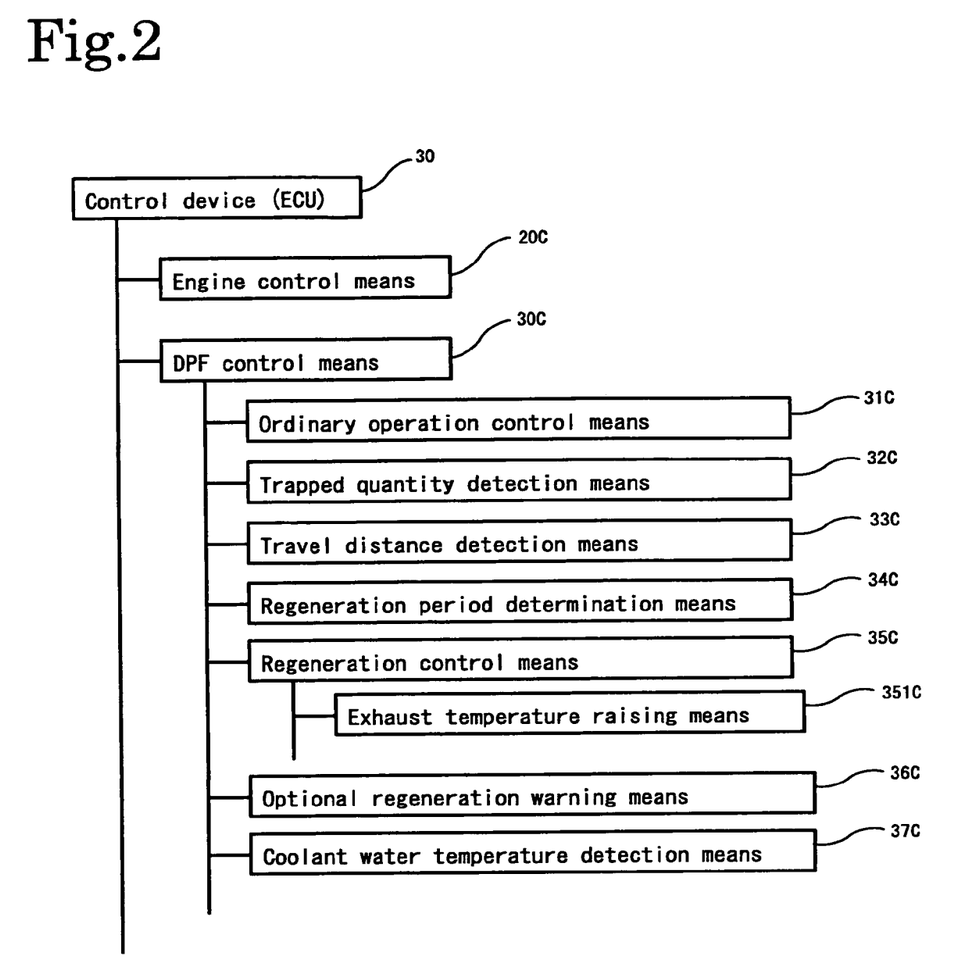
FIG. 2 is a diagram showing the configuration of the control means of an exhaust gas purification system in accordance with an embodiment of the present invention.

Also, as shown in FIG. 2, the control device 30 is configured having engine control means 20C for controlling the operation of the engine 10, and diesel particulate filter (DPF) control means 30C for the exhaust gas purification system 1. Also, the DPF control means 30C is configured having ordinary operation control means 31C, trapped quantity detection means 32C, travel distance detection means 33C, regeneration period determination means 34C, regenerative control means 35C, optional regeneration warning means 36C, and coolant water temperature detection means 37C.

The ordinary operation control means 31C is a means for conducting ordinary operation without any particular relationship to the regeneration of the continuous regeneration type DPF device 12. According to the power application time signal computed by the control device 30 that is based on the signal of the acceleration position sensor 24 and the signal of the revolution sensor 25, the means 31C conducts an ordinary fuel injection control wherein a predetermined quantity of fuel is injected from the fuel injection device 17. In other words, it is a means configured not to conduct in particular a control for regenerative control.

The trapped quantity detection means 32C is a means for detecting the trapped quantity of PM trapped at the catalytic filter 12b of the continuous regeneration type DPF device 12. In this embodiment, the means detects trapped quantities of PM using the differential pressure between before and after the continuous regeneration type DPF device 12, i.e., a measured value ΔPm from the differential pressure sensor 21.

The travel distance detection means 33C is a means for detecting the distance ΔMc which the vehicle has traveled after DPF generation. When forced regeneration is conducted, the travel distance ΔMc is reset at a suitable time from the regeneration start time to the regeneration end time.

The regeneration period determination means 34C is a means for determining the DPF regeneration start time by respectively comparing the differential pressure detected value ΔPm detected at the trapped quantity detection means 32C and the travel distance ΔMc detected by the travel distance detection means 33C to each predetermined determination value.

The regenerative control means 35C differs to some degree according to the type of the continuous regeneration type DPF device 12, but is configured having exhaust temperature raising means 351C. The exhaust temperature raising means 351C is a means for raising the exhaust temperature up to the activation temperature of the oxidation catalyst 12a, when the exhaust gas temperature measured at the oxidation catalyst inlet exhaust temperature sensor 22 is lower than a predetermined determination temperature. The means 351C conducts post injection, or alternatively, multi-injection (multi-step delay injection) and post injection, for in-cylinder injection of the engine 10. In this exhaust temperature raising, by conducting in parallel exhaust throttling wherein the exhaust throttle valve 13 is closed, the filter inlet exhaust temperature detected at the filter inlet exhaust temperature sensor 23 is raised, and the catalytic filter 12b is made to reach a temperature and become an environment suitable for PM removal by oxidation. As a result, the PM trapped in the catalytic filter 12b is forcibly removed by combustion, and thus forced regeneration is conducted on the catalytic filter 12b. It should be appreciated that in this exhaust gas temperature raising control, an air-intake throttling control for throttling the air-intake throttle valve 16 and the EGR control may also be used in conjunction with the above.

The optional regeneration warning means 36C includes the blinking indicator (DPF lamp) 26, the warning indicator (warning lamp) 27, etc. The means 36C is a means for issuing a warning encouraging the driver to manually operate the regenerative control means 35C by blinking the blinking indicator 26, and for encouraging the driver to take the vehicle to a service center by lighting the warning indicator 27. Moreover, the driver receiving this warning is able to start the regenerative control by the regenerative control means 35C by operating the manual regeneration button (manual regeneration switch) 28.

The coolant water temperature detection means 37C includes a water temperature sensor (not shown in the drawings) or similar devices provided in the engine 10. The means 37C is a means for detecting the temperature Tw of the engine coolant water.

Thus, the DPF control means 30C having these various means is configured as a means for: maintaining continuous ordinary operation by the ordinary operation control means 31C, based on the detected differential pressure ΔPm between before and after the DPF at the trapped quantity detection means 32C, and the travel distance ΔMc after DPF regeneration detected at the travel distance detection means 33C; issuing warnings encouraging the driver to manually operate the regenerative control means 35C; and automatically operating the regenerative control means 35C.

Next, the DPF control of the exhaust gas purification system 1 will be described. In this control of the exhaust gas purification system 1, ordinary operation is conducted and PM is trapped by the ordinary operation control means 31C. In this ordinary operation, the regeneration period determination means 34C monitors whether or not it is a regeneration period. When it is determined by the regeneration period determination means 34C that it is a regeneration period, a warning is issued by the optional regeneration warning means 36C, or alternatively, traveling automatic regeneration is conducted by the regenerative control means 35C.

In other words, according to whether or not the detected differential pressure ΔPm between before and after the DPF at the trapped quantity detection means 32C and the travel distance ΔMc detected at the travel distance detection means 33C are within a predetermined region, it is determined whether or not optional regeneration is necessary, or alternatively, whether or not traveling automatic regeneration is necessary. Also, based on this determination result, and after the various necessary processing has been conducted, the system returns to again conducting ordinary operation by the ordinary operation control means 31C. Furthermore, by repeating ordinary operation and DPF control, vehicle operation is conducted.

Figure 6:
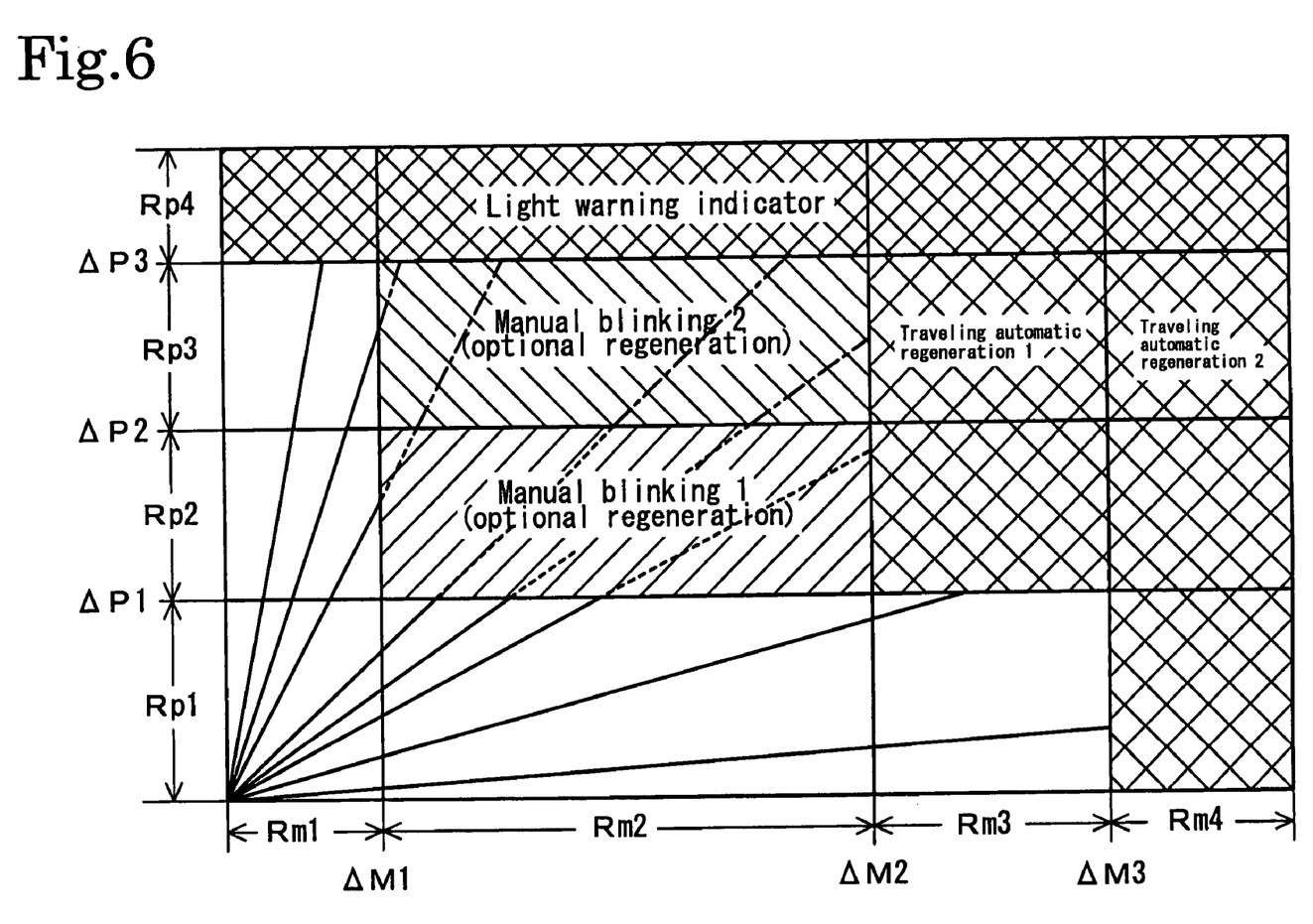
FIG. 6 is a schematic diagram showing a map for a DPF control in an exhaust gas purification system.
Figure 7:
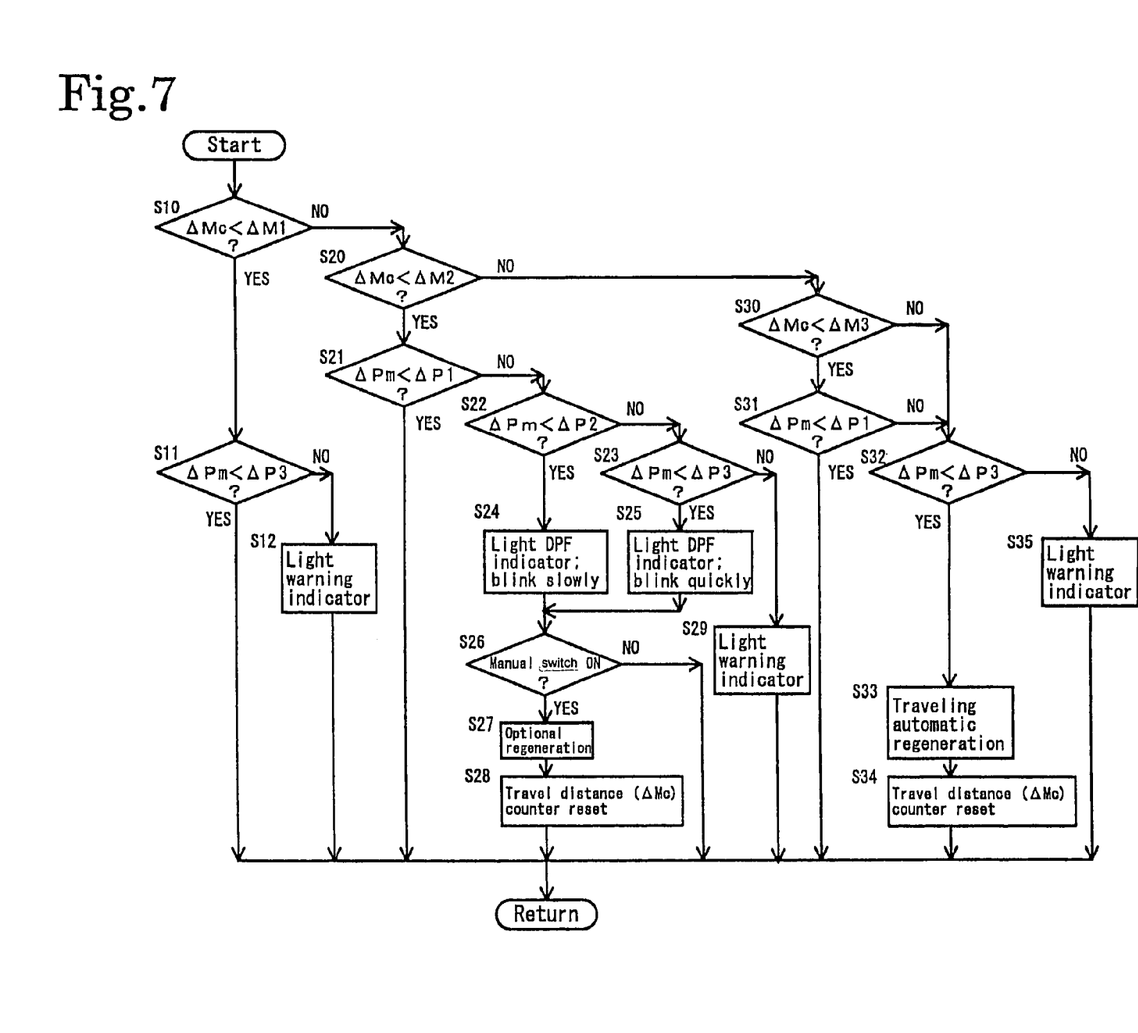
FIG. 7 is a diagram showing an example of the operational flow of a DPF control in an exhaust gas purification system.

The DPF control will now be described with reference to the map for DPF control shown in FIG. 6. Furthermore, this DPF control may be implemented according to the DPF control flowchart illustrated as an example in FIG. 7.

First, if forced regeneration is conducted while the travel distance ΔMc is in a domain Rm1 smaller than a first threshold value ΔM1, the fuel in the oil will be insufficiently vaporized, and therefore the execution of regenerative control will be prohibited in order to avoid problems such as oil dilution.

Next, in the case where the travel distance ΔMc is in a predetermined region Rm2 between the first threshold value ΔM1 and a second threshold value ΔM2, automatic forced regeneration is not conducted, as the fuel portion mixed into the engine oil will be insufficiently vaporized because of insufficient travel, and for that reason, when the detected differential pressure ΔPm between before and after the DPF exceeds a first threshold value ΔP1 (manual blinking 1), the blinking indicator (DPR lamp) 26 is slowly blinked. By doing so, the driver is encouraged to stop the vehicle and press the manual regeneration button 28 to conduct optional regeneration (manual regeneration), which conducts forced regeneration. Furthermore, when the detected differential pressure ΔPm between before and after the DPF exceeds a second threshold value ΔP2 that is larger than the first threshold value ΔP1 (manual blinking 2), the blinking indicator 26 is quickly blinked. By doing so, the driver is strongly encouraged to stop the vehicle and manually conduct forced regeneration.

Also, in the case where the travel distance ΔMc is in a predetermined region Rm3 between the second threshold value ΔM2 and a third threshold value ΔM3, the fuel portion mixed into the engine oil will be sufficiently vaporized, and it will be possible to conduct automatic forced regeneration while traveling (traveling automatic regeneration). Therefore, when the detected differential pressure ΔPm between before and after the DPF exceeds the first threshold value ΔP1 (traveling automatic regeneration 1), regenerative control is conducted automatically. As a result of this traveling automatic regeneration, the load on the forced regeneration manually conducted by the driver, i.e., the load related to ON/OFF operation of the manual regeneration button, will be lightened.

Furthermore, unrelated to the detected differential pressure $\Delta Pm$ between before and after the DPF, in the case where the travel distance $\Delta Mc$ is in a predetermined region Rm4 exceeding the third threshold value $\Delta M3$, regenerative control is automatically conducted in order to prevent thermal runaway as well as DPF melting damage due to PM uneven-accumulation in the catalytic filter 12b.

Figure 3:
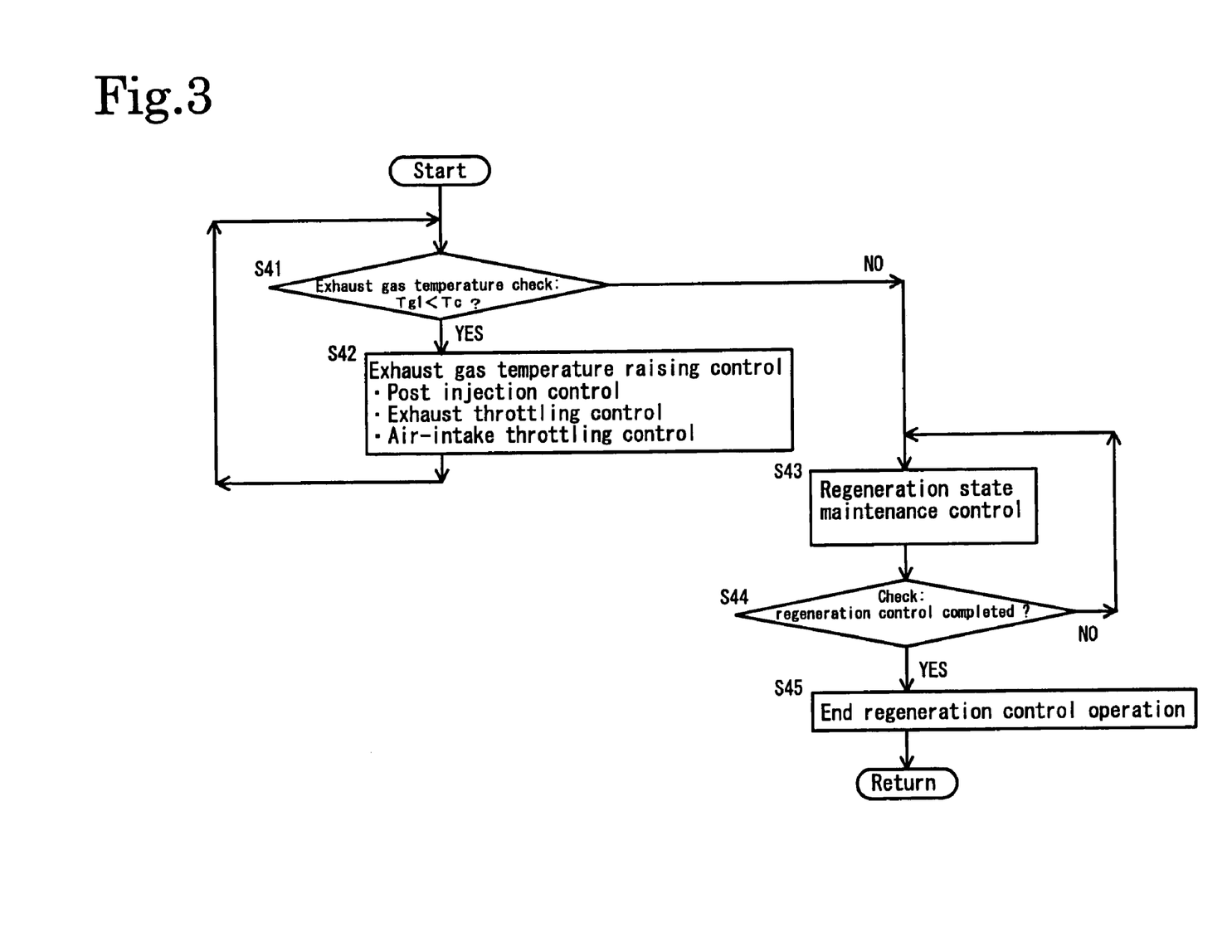
FIG. 3 is a diagram showing an example of the operational flow of a regenerative control.

As shown in FIG. 3, in these regenerative controls, the temperature Tg1 of exhaust gas inflowing to the catalytic filter 12b is checked in step S41. In the determination in this step S41, in the case where the exhaust gas temperature Tg1 is lower than a predetermined determination temperature Tc that is related to the temperature at which the combustion of PM accumulated in the catalytic filter 12b begins, i.e., in the case where it is determined that the temperature of the catalytic filter 12b has not surpassed the temperature at which PM begins to combust, an exhaust gas temperature raising control is conducted in step S42 at a predetermined interval (a time related to the check interval of the exhaust gas temperature), and then the process returns to step S41. In this exhaust gas temperature raising control, depending on post injection control, exhaust throttling control and circumstances, air-intake throttling control is conducted.

Also, in the determination in step S41, in the case where the exhaust gas temperature Tg1 has exceeded the predetermined determination temperature Tc, i.e., in the case where it is determined that the temperature of the catalytic filter 12b has surpassed the temperature at which PM begins to combust, the process transitions to a second stage, and in step S43, a regeneration state maintenance control is conducted at a predetermined interval (a time related to the check interval of the regenerative control completion). In this regeneration state maintenance control, in a manner similar to the exhaust gas temperature raising control, depending on post injection, exhaust throttling control, and circumstances, air-intake throttling control is conducted, such that the catalytic filter 12b maintains a high temperature at which PM combustion is possible, thus maintaining a regeneration-capable state.

In step S44 it is determined whether or not regenerative control has completed. This determination can be conducted by the following: determining whether or not the time spent maintained in a regeneration-capable state by the regeneration state maintenance control, for example, the time during which the temperature Tg1 of exhaust gas inflowing to the catalytic filter 12b is above a predetermined temperature, has passed a previously set regeneration time; determining whether or not there is a change in oxygen concentration at an oxygen concentration sensor (not shown in the drawings) posterior to the catalytic filter 12b,i.e., whether or not PM combustion has finished and thus oxygen concentration has risen.

In the determination in step S44, in the case where regenerative control has not completed, the process returns to step S43 and the regeneration state maintenance control continues. In the determination in step S44, in the case where regenerative control has been completed, a regenerative control stop operation is conducted in step S45, and the process returns. In this regenerative control stop operation, post injection control is stopped, exhaust throttling control is stopped, and if air-intake throttling control is being conducted, air-intake throttling control is stopped. In addition, if needed, a regenerative control flag is reset, etc., in order to record the fact that regenerative control has stopped.

The temperature of the catalytic filter 12b is raised by this exhaust gas temperature raising control, and once PM begins to combust, the combustion is maintained by the heat of PM combustion. For this reason, this temperature raising control is configured to stop. Furthermore, oxygen concentration and exhaust gas temperature downstream of the continuous regeneration type DPF device 12 are monitored by the regeneration state maintenance control, and the temperature raising control is re-activated as appropriate so that PM combustion is not interrupted.

Furthermore, unrelated to the travel distance $\Delta Mc$, when the detected differential pressure $\Delta Pm$ between before and after the DPF exceeds the third threshold value $\Delta P3$ (enters a domain Rp4 (blinking warning indicator)), in order to avoid thermal runaway of sudden PM combustion, optional regeneration as well as traveling automatic regeneration are prohibited, and the warning indicator 27 is lighted to encourage the driver to take the vehicle to a service center.

Consequently, the DPF control means 30C is configured having: an optional regeneration mode that conducts regenerative control of the catalytic filter 12b in the case where the driver pushes the manual regeneration button 28, the driver having been alerted to conduct regenerative control in a idling stop state; and a traveling automatic regeneration mode that automatically conducts regenerative control of the catalytic filter 12b while the vehicle is traveling.

Figure 4:
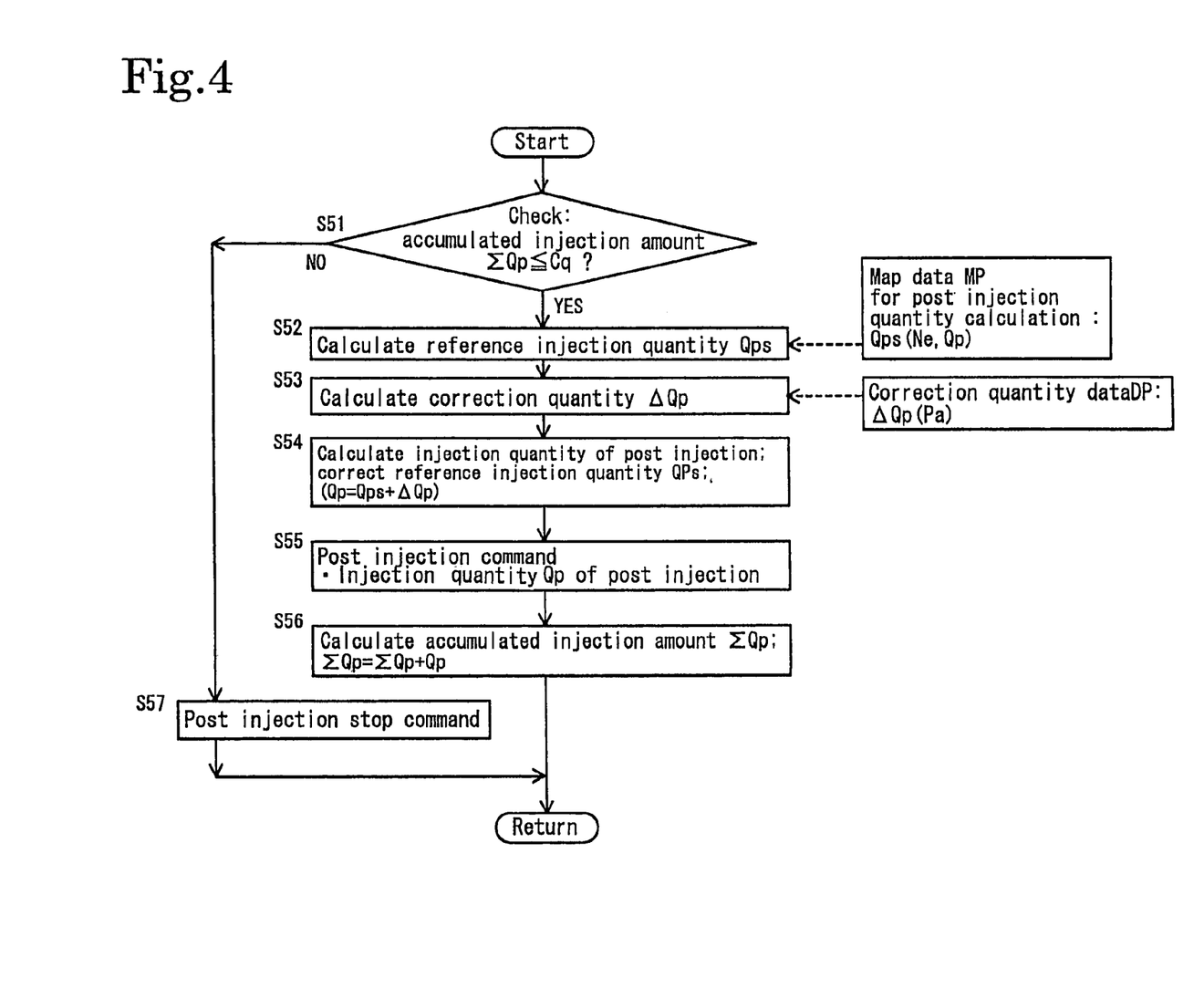
FIG. 4 is a diagram showing an example of the operational flow of a post injection control.

Also in the present invention, in the regenerative control means 35C that conducts a regenerative control in the optional regeneration mode and the traveling automatic regeneration mode, when post injection is conducted, the control is implemented as shown in the post injection control flow in FIG. 4. When this control flow in FIG. 4 is started, it is determined in step S51 whether or not an accumulated injection amount $\Sigma Qp$ of post injection exceeds a predetermined determination value Cq. If this value is not exceeded, the process proceeds to step S52.

Figure 5:
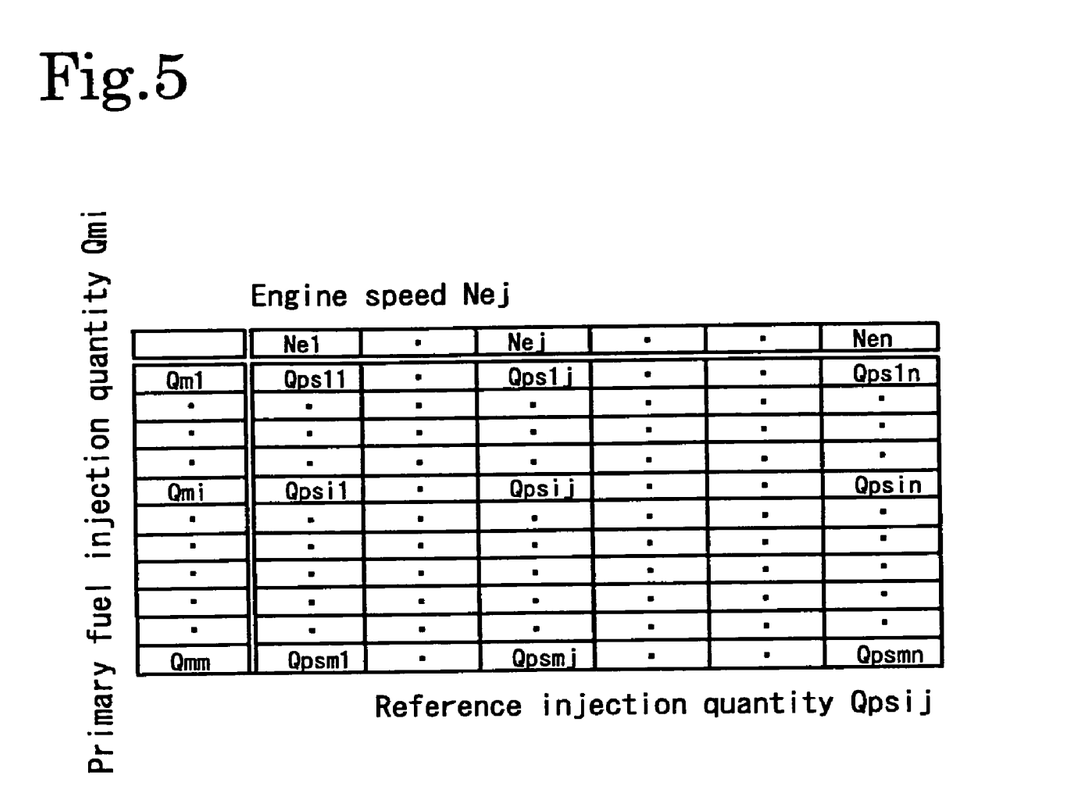
FIG. 5 is a diagram showing an example of map data for calculating post injection quantities.

In step S52, a post injection reference injection quantity Qps is calculated based on map data Mp for calculating post injection quantity, this map data is previously set having engine speed Ne and primary fuel injection quantity Qm as parameters. As shown in FIG. 5 for example, this map data Mp for calculating post injection quantity is data wherein engine speeds Nej are arranged as columns, primary fuel injection quantities Qmi are arranged as rows, and reference injection quantities Qpsij are arrayed in the cells formed thereby. Thus, from an engine speed Nej and a primary fuel injection quantity Qmi, a reference injection quantity Qpsij can be calculated. Furthermore, in the case where the engine speed Ne and the primary fuel injection quantity Qm fall between the data in the map data Mp, a reference injection quantity Qps can be interpolated.

In the next step S53, a correction quantity $\Delta Qp$ is calculated according to the atmospheric pressure Pa. This correction quantity $\Delta Qp$ may be stored as data having a 1-to-1 correspondence to the numerical value of the atmospheric pressure Pa, or stored in the form of a function. Thus, for a given atmospheric pressure Pa, the correction quantity $\Delta Qp$ is calculated from these data or this function, interpolating if necessary. This atmospheric pressure correction is conducted in order to change the air quantity (oxygen ($O_2$) quantity) according to the atmospheric pressure.

In the next step S54, the correction quantity $\Delta Qp$ is added to the reference injection quantity Qps, thus correcting the reference injection quantity Qps, and calculating an injection quantity Qp of post injection.

In step S55, a command is issued to conduct post injection with this calculated injection quantity Qp. This command is converted into an electrical control signal by the control device 30, and transmitted to the fuel injection device 17. The fuel injection device 17 receives this electrical signal, and conducts fuel injection such that the quantity Qp will be post-injected.

In step S56, this calculated injection quantity Qp is accumulated. In other words, the injection Qp is added to accumulated injection amount ΣQp of previous post injection, resulting in a new accumulated injection amount ΣQp of post injection. When the post injection control of FIG. 4 is called and executed, this new accumulated injection amount ΣQp is checked in step S51. The process returns after step S56, and this post injection control ends.

Also, in step S51, in the case where the accumulated injection amount ΣQp of post injection exceeds the predetermined determination value Cq, the post injection is stopped in step S57, or the process returns while in a stopped state. As a result, this post injection control ends.

Furthermore, when a predetermined time necessary for regeneration has passed, or when the detected differential pressure ΔPm between before and after the continuous regeneration type DPF device 12 falls below a predetermined quantity, and therefore it is determined that regeneration has been completed and regenerative control ends, this accumulated injection amount ΣQp of post injection is reset to zero. The accumulated injection amount ΣQp is accumulated starting from the time of this reset.

The injection quantity Qp of post injection is used by this post injection control to calculate a reference injection quantity Qps based on map data Mp for calculating post injection quantity that is previously set having engine speed Ne and primary fuel injection quantity Qm as parameters. Furthermore, this reference injection quantity Qps is corrected according to the atmospheric pressure Pa to calculate an injection quantity Qp. This calculated injection quantity Qp is accumulated from the time after being reset when post injection begins, and an accumulated injection amount ΣQp of post injection is calculated. In the case where this accumulated injection amount ΣQp has exceeded a predetermined determination value Cq, post injection is stopped.

In addition, the injection quantity Qp of post injection is used to calculate a reference injection quantity Qps calculated based on the map data Mp, and corrected according to the atmospheric pressure Pa. Thus, more accurate injection quantities of post injection can be calculated using a simple algorithm, and control with high precision becomes possible.

Consequently, in the foregoing control method of the exhaust gas purification system and exhaust gas purification system 1, excessive injection of fuel by post injection during regenerative control can be prevented. For this reason, oil dilution due to fuel can be avoided before it occurs.

Furthermore, in the foregoing description, a device carrying a catalyst at the filter, as well as being provided with an oxidation catalyst disposed upstream of the filter, was described by way of example as the DPF device in the exhaust gas purification system. However, it should be appreciated that the present invention is not to be limited thereto, and a DPF device with a filter that does not carry a catalyst, a continuous regeneration type DPF device with a filter carrying an oxidation catalyst, a continuous regeneration type DPF device with a filter and an oxidation catalyst disposed upstream of the filter, or other types of DPFs may also be applied.

Furthermore, a regenerative control for recovering the NOx purification ability of a NOx occlusion reduction type catalyst, a NOx direct reduction type catalyst, etc., may also be applied to the present invention. Also, in the case where the exhaust gas purification device carries an oxidation catalyst, a NOx occlusion reduction type catalyst, a NOx direct reduction type catalyst, a SCR catalyst (selective catalytic reduction catalyst), etc., a control such as a sulfur purge control for recovering from sulfur poisoning may also be applied.

The control method of the exhaust gas purification system and exhaust gas purification system of the present invention, having the above-described advantages, are provided with an exhaust gas purification device for purifying components in the exhaust gas of an internal combustion engine such as a diesel engine. In order to recover the purification ability of this exhaust gas purification device, post injection is conducted in an in-cylinder fuel injection control, and the oil dilution that occurs during an exhaust gas temperature raising control that raises the temperature of exhaust gas can be avoided before it occurs. Consequently, the present invention can be utilized highly effectively as a control method of an exhaust gas purification system and exhaust gas purification system for the exhaust gas of an internal combustion engine mounted onboard an automobile.

What is claimed is:

1. A control method of an exhaust gas purification system in an exhaust gas passage of an internal combustion engine, the system provided with an exhaust gas purification device for purifying components in exhaust gas, and a regenerative controller that conducts a regenerative control, including a post injection of fuel in an in-cylinder fuel injection control, for recovering a purification ability of the exhaust gas purification device, the method comprising the steps of:
   storing pre-set map data based on an operating condition of the engine including a primary fuel injection quantity as a parameter;
   during the regenerative control, determining whether a temperature of the exhaust gas exceeds a predetermined determination temperature and, if so, executing a regeneration state maintenance control including the post injection of fuel and exhaust gas throttling;
   also, during the regenerative control, calculating an injection quantity of the post injection of fuel based on the pre-set map data;
   accumulating this calculated injection quantity, thereby calculating a post injection accumulated injection amount of fuel;
   when the accumulated injection amount of fuel exceeds a predetermined value, stopping the post injection of fuel;
   determining that the regenerative control has stopped; and
   resetting the accumulated injection amount to zero.

2. The control method of an exhaust gas purification system according to claim 1, further comprising the step of:
   correcting the injection quantity of the post injection of fuel according to atmospheric pressure, and the map data also includes an engine speed as a parameter.

3. The control method of an exhaust gas purification system according to either of claim 1 or 2, wherein:
   the exhaust gas purification device is formed to be any one of the following or a combination thereof:
   a continuous regeneration type diesel particulate filter device with a filter carrying an oxidation catalyst;
   a continuous regeneration type diesel particulate filter device with a filter and an oxidation catalyst disposed upstream of the filter; and
   a continuous regeneration type diesel particulate filter device with a filter carrying catalyst and an oxidation catalyst disposed upstream of the filter.

4. An exhaust gas purification system in an exhaust gas passage of an internal combustion engine, comprising:
   a memory including pre-set map data based on an operating condition of an engine including a primary fuel injection quantity as a parameter;

an exhaust gas purification device for purifying components in exhaust gas; and a regenerative controller that conducts a regenerative control, including post injection of fuel in an in-cylinder fuel injection control, for recovering a purification ability of the exhaust gas purification device, wherein, during the regenerative control, the regenerative controller determines whether a temperature of the exhaust gas exceeds a predetermined temperature and, if so, the regenerative controller causes a regeneration state maintenance control, including the post injection of fuel and exhaust gas throttling, and also during the regenerative control, the regenerative controller calculates an injection quantity of the post injection of fuel based on the pre-set map data, accumulates this calculated injection quantity to calculate a post injection of fuel accumulated injection amount, and when the accumulated injection amount exceeds a predetermined value, stops the post injection of fuel and, when the regenerative control has stopped, the regenerative controller resets the accumulated injection amount to zero.

5. The exhaust gas purification system according to claim 4, wherein:

the regenerative controller corrects the injection quantity of the post injection of fuel according to atmospheric pressure, and the map data also includes an engine speed as a parameter.

6. The exhaust gas purification system according to either of claims 4 or 5, wherein:

the exhaust gas purification device is any one of the following or a combination thereof:

a continuous regeneration type diesel particulate filter device with a filter carrying an oxidation catalyst;

a continuous regeneration type diesel particulate filter device with a filter and an oxidation catalyst disposed upstream of the filter; and a continuous regeneration type diesel particulate filter device with a filter carrying catalyst and an oxidation catalyst disposed upstream of the filter.

* * * * *